(12) United States Patent
Webster

(10) Patent No.: US 9,284,914 B2
(45) Date of Patent: Mar. 15, 2016

(54) VARIABLE GEOMETRY STRUCTURE

(75) Inventor: John R. Webster, Derby (GB)

(73) Assignee: ROLLS ROYCE plc, London (GB)

( * ) Notice: Subject to any disclaimer, the term of this patent is extended or adjusted under 35 U.S.C. 154(b) by 178 days.

(21) Appl. No.: 13/591,860

(22) Filed: Aug. 22, 2012

(65) Prior Publication Data

US 2014/0027538 A1 Jan. 30, 2014

(30) Foreign Application Priority Data

Sep. 14, 2011 (GB) .................... 1115860.7

(51) Int. Cl.
| | |
|---|---|
| *F02K 1/06* | (2006.01) |
| *F02K 1/10* | (2006.01) |
| *B64C 3/46* | (2006.01) |
| *B64C 3/48* | (2006.01) |
| *F02K 1/15* | (2006.01) |

(52) U.S. Cl.
CPC ... *F02K 1/10* (2013.01); *B64C 3/46* (2013.01); *B64C 3/48* (2013.01); *F02K 1/06* (2013.01); *F02K 1/15* (2013.01)

(58) Field of Classification Search
CPC ............. F02K 1/70; F02K 1/72; F02K 3/075; F02K 1/002; F02K 1/008; F02K 1/06; F01D 17/12; F01D 17/14; F01D 17/16; F01D 17/162
USPC ...................... 60/226.2, 226.3, 230, 262, 771; 239/265.11, 265.19, 265.23, 265.33; 244/219, 99.8, 99.2, 110 B
See application file for complete search history.

(56) References Cited

U.S. PATENT DOCUMENTS

| | | | | | |
|---|---|---|---|---|---|
| 1,341,758 | A | * | 6/1920 | Parker ....................... | B64C 3/48 244/219 |
| 1,567,531 | A | * | 12/1925 | Magni ....................... | B64C 3/48 244/215 |
| 1,766,107 | A | * | 6/1930 | Cook, Jr. .................. | B64C 3/48 244/214 |
| 3,785,567 | A | * | 1/1974 | Fisher ....................... | 239/265.39 |
| 3,954,230 | A | * | 5/1976 | Machuta ................... | B64C 3/48 244/12.5 |
| 5,662,294 | A | * | 9/1997 | Maclean ................... | B63B 1/28 114/140 |
| 5,794,893 | A | * | 8/1998 | Diller ........................ | B64C 3/48 244/130 |

(Continued)

FOREIGN PATENT DOCUMENTS

| | | |
|---|---|---|
| EP | 1 482 159 A2 | 12/2004 |
| EP | 1 607 603 A2 | 12/2005 |

(Continued)

OTHER PUBLICATIONS

James et al., "Morphing Skins: Development of New Hybrid Materials," 4th SEAS DTC Technical Conference, Edinburgh, 2009.
Nov. 29, 2011 British Search Report issued in British Application No. GB1115860.7.

*Primary Examiner* — Phutthiwat Wongwian
*Assistant Examiner* — Marc Amar
(74) *Attorney, Agent, or Firm* — Oliff PLC

(57) ABSTRACT

A variable geometry (2) structure comprising: an flexural element (4); a tensioning element (6) connected to the flexural element (8); and an actuator (12) for adjusting the tensioning element (6) to change the load placed on the flexural element (4), thereby changing the geometry of the structure (2).

15 Claims, 3 Drawing Sheets

(56) References Cited

U.S. PATENT DOCUMENTS

| | | | |
|---|---|---|---|
| 6,015,115 A * | 1/2000 | Dorsett | B64C 3/46 244/123.11 |
| 6,152,405 A * | 11/2000 | Muller | B64C 3/48 244/212 |
| 8,382,045 B2 * | 2/2013 | Manley | B64C 9/16 244/213 |
| 8,844,879 B2 * | 9/2014 | Santini | B64C 3/48 244/198 |
| 2005/0229585 A1 * | 10/2005 | Webster | 60/226.1 |
| 2006/0000211 A1 * | 1/2006 | Webster | F02K 1/383 60/527 |
| 2006/0101807 A1 | 5/2006 | Wood et al. | |
| 2006/0157623 A1 * | 7/2006 | Voglsinger | B64C 3/48 244/219 |
| 2008/0256957 A1 * | 10/2008 | Webster | 60/770 |
| 2010/0224734 A1 * | 9/2010 | Grip | 244/219 |
| 2011/0030380 A1 | 2/2011 | Widdle, Jr. et al. | |

FOREIGN PATENT DOCUMENTS

| | | |
|---|---|---|
| EP | 1 612 373 A2 | 1/2006 |
| EP | 1 612 416 A1 | 1/2006 |
| EP | 1612416 A1 * | 1/2006 |
| EP | 2 113 649 A2 | 11/2009 |
| GB | 859993 | 1/1961 |
| GB | 1116639 | 6/1968 |
| GB | 2 372 779 A | 9/2002 |
| GB | 2 372 780 A | 9/2002 |
| GB | 2 374 121 A | 10/2002 |
| WO | WO 2006/055217 A1 | 5/2006 |

* cited by examiner

VARIABLE GEOMETRY STRUCTURE

The present invention relates to a variable geometry structure and particularly, but not exclusively, to a variable geometry structure for a gas turbine engine.

BACKGROUND

Variable geometry structures are used in the aerospace industry to alter the characteristics of a component depending on, for example, the operational mode of a gas turbine engine.

For example, UK Patent Application GB 2374121 discloses a gas turbine engine nozzle having a plurality of tabs which are movable between a deployed position and a non-deployed position. The tabs are formed from shape memory material. Below a predetermined temperature the tabs assume the non-deployed position. However, above the predetermined temperature, the shape memory material deforms to adopt the deployed position. Accordingly, the deployment of the tabs may be actuated by heating the tabs. In the deployed position the tabs interact with the gas stream to generate and shed noise-reducing vortices.

Whilst the shape memory material allows the geometry to be changed, the temperature must be maintained in order to retain the tabs in the deployed position. Furthermore, the mechanism typically only provides two different positions. That said, additional positions may be achieved using two-way shape memory or using zone heating, however this adds complexity to the structure and operation.

The present invention seeks to overcome the above mentioned problems and to provide a more adaptable structure.

STATEMENTS OF INVENTION

In accordance with a first aspect of the invention there is provided a variable geometry structure comprising: a flexural element; a tensioning element connected to the flexural element; and an actuator for adjusting the tensioning element to change the load placed on the flexural element, thereby changing the geometry of the structure.

The tensioning element may be adjusted by changing the direct distance between the end points or connection points of the tensioning element.

The flexural element may be curved when unstressed.

The tensioning element may have a first configuration.

The flexural element may be substantially planar when the tensioning element is in the first configuration.

The tensioning element may have a second configuration which may place a higher load on the flexural element than the first configuration.

The flexural element may be curved when the tensioning element is in the second configuration.

The actuator may be operable to change the tensioning element from the first configuration to the second configuration and/or from the second configuration to the first configuration.

The actuator may be configured to adjust the tensioning element by displacing the tensioning element.

The actuator may be configured to adjust the tensioning element by pulling the tensioning element.

The actuator may be hydraulically or pneumatically actuated. The actuator may comprise a motor or ball screw, a piezoelectric arrangement or a shape memory material.

The actuator may be configured to pull the tensioning element in a longitudinal direction.

The actuator may be configured to push and/or pull the tensioning element in a transverse direction. This may provide more movement at a lower force.

The tensioning element may comprise a shape memory material (i.e. a shape memory alloy) and the actuator may be configured to heat the shape memory material above a predetermined temperature thereby changing the shape of the shape memory material and changing the load on the flexural element.

The tensioning element may comprise a cavity and the actuator may be configured to expand and/or contract the cavity thereby changing the shape of the cavity and changing the load on the flexural element.

The actuator may be configured to inflate and/or deflate the cavity.

The cavity may be formed between the tensioning element and the flexural element.

The tensioning element may comprise first and second layers and the cavity may be formed between the first and second layers.

The tensioning element and flexural element may be separated by a spacing member. For example, a plurality of spacing members may be disposed between the tensioning element and flexural element which may act as struts or ties.

The area between the tensioning element and the flexural element may be filled with a material.

The flexural element may be elastically deformable.

The variable geometry structure may be used to form a variable area nozzle for a gas turbine engine. Alternatively, the variable geometry structure may be used in other areas of a gas turbine engine, such as in heat exchanger intakes, adaptive inlet particle separators, blades, vane leading edges, variable combustor geometry, etc. The variable geometry structure may also be used in airframe controls, for example as slats, flaps, or a rudder, and in automotive applications such as adaptive spoilers/wings, and radiator or other heat exchanger intakes etc.

The mechanism requires a relatively low force to bend the flexural element during actuation since it is only the flexural element which must be bent. It also means that only a low strain is required in the flexural element which is bending substantially about its own neutral axis. Consequently, the overall structure is bent far more than would be possible by bending a thick beam.

Under external loads, the flexural element and tensioning element act together as a thick compound beam. Therefore, the structure is able to withstand such external loads without excessive bending.

During actuation, the structure moves smoothly between the various positions thus avoiding any rapid changes in aerodynamic lines.

The actuation of the structure is simple and does not significantly increase the weight and complexity of the component.

In accordance with another aspect of the invention there is provided a variable geometry structure comprising: a flexural element; a forcing element connected to the flexural element; and an actuator for adjusting the forcing element to change the load placed on the flexural element, thereby changing the geometry of the structure. The actuator may be configured to push the forcing element in a longitudinal direction.

BRIEF DESCRIPTION OF THE DRAWINGS

For a better understanding of the present disclosure, and to show more clearly how it may be carried into effect, reference will now be made, by way of example, to the accompanying drawings, in which:—

DETAILED DESCRIPTION

Figure 1:
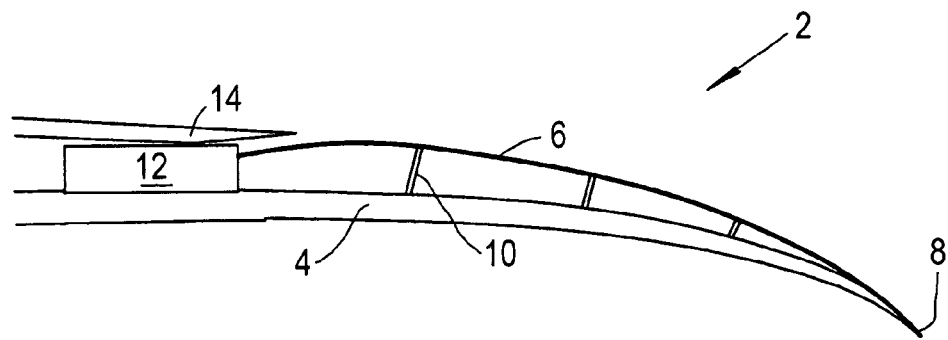
FIG. 1 is a cross-sectional side view of a variable geometry structure in an unstressed configuration.

With reference to FIG. 1, a variable geometry structure 2, such as a variable area nozzle, according to an embodiment of the invention is shown. The variable geometry structure 2 comprises a flexural element 4. The flexural element 4 is deformed through bending when placed under a load. The flexural element 4 has elasticity and thus is able to return to its free or undeformed position when the load is removed.

The variable geometry structure 2 further comprises a forcing element, herein referred to as tensioning element 6, which is disposed adjacent to the flexural element 4. The flexural element 4 and tensioning element 6 may be constructed from metal and/or composite materials. The flexural element 4 and tensioning element 6 are connected at their distal ends (indicated at 8). A plurality of spacing members 10 are provided between the flexural element 4 and tensioning element 6. The spacing members 10 are spaced along the length of the variable geometry structure 2 and lie substantially perpendicular to opposing surfaces of the flexural element 4 and tensioning element 6. Accordingly, the spacing members 10 act as struts and/or ties. The tensioning element 6 has a fixed length and the tensioning element 6 consists of a material with normal elastic properties, e.g. it returns to its original shape/length when a deforming load, or stress, is removed.

In the example of a variable area nozzle, the flexural element 4 may form the inner surface of the nozzle and the tensioning element 6 may form the outer surface of the nozzle.

The variable geometry structure 2 also comprises an actuator 12. The actuator 12 is affixed to the flexural element 4. The actuator 12 comprises an actuating mechanism (not specifically shown) which is attached to a proximal end of the tensioning element 6. Accordingly, the tensioning element 6 is connected at its distal end to the flexural element 4 and is connected at its proximal end to the actuating mechanism of the actuator 12. The actuating mechanism of the actuator 12 is operable to displace or pull the tensioning element 6 in a longitudinal direction. In other words, the actuating mechanism alters the distance between the distal end of the tensioning element 6 and the fixed position of the actuator 12. The flexural element 4 provides resistance to any displacement of the tensioning element 6. Consequently, the displacement of the tensioning element 6 alters the tension in the tensioning element 6 and the load placed on the flexural element 4. This causes the geometry of the structure 2 to be varied.

The actuating mechanism of the actuator 12 may displace the tensioning element 6 using any suitable means. For example, the actuating mechanism may linearly translate the proximal end of the tensioning element 6 using, for example, a ball screw. Alternatively, the actuating mechanism may comprise a spool around which the tensioning element 6 may be wound using a motor.

A cover member 14 is provided over the actuator 12. The tensioning element 6 and cover member 14 provide a smooth aerodynamic profile to the variable geometry structure 2.

FIG. 1 shows the variable geometry structure 2 in the free position where the tensioning element 6 is not under (or under negligible) tension and thus no load is placed on the flexural element 4 (or insufficient load to cause the flexural element 4 to bend). As shown, in the free or undeformed position, the flexural element 4 is curved downwards away from the tensioning element 6.

Figure 2:
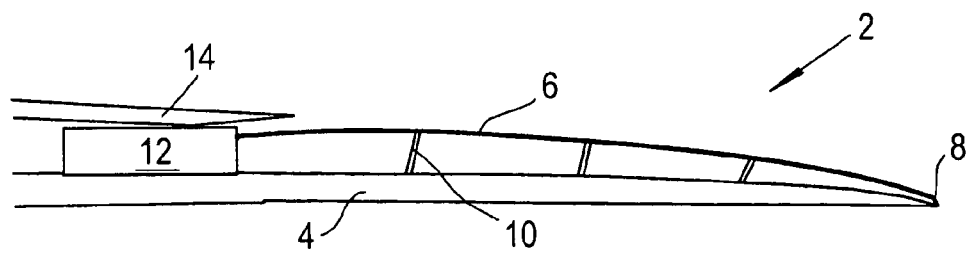
FIG. 2 is a cross-sectional side view of the variable geometry structure of FIG. 1 in a first stressed configuration.

In use, the actuating mechanism of the actuator 12 displaces the tensioning element 6 by pulling it in a longitudinal direction, thereby increasing the tension in the tensioning element 6 and bending the flexural element 4 upwards from the free position, as shown in FIG. 2. In this first configuration the flexural element 4 is substantially planar and is stressed in bending. Furthermore, the tension in the tensioning element 6 provides stiffness to the tensioning element 6 and prevents the tensioning element 6 from buckling under external loads. In FIG. 2 the actuator 12 has decreased the distance between the distal end of the tensioning element 6 and the fixed position of the actuator 12 compared to that in FIG. 1.

Figure 3:
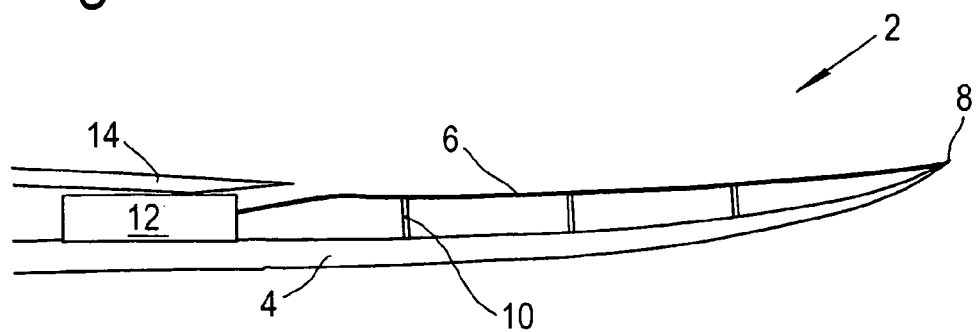
FIG. 3 is a cross-sectional side view of the variable geometry structure of FIG. 1 in a second stressed configuration.

The actuator 12 is able to change the tensioning element from the first configuration shown in FIG. 2 to a second configuration shown in FIG. 3, and vice versa.

In a transition from the first configuration to the second configuration, the actuating mechanism of the actuator 12 further displaces the tensioning element 6. This increases the tension in the tensioning element 6 and bends the flexural element 4 so that it curves upwards, as shown in FIG. 3. In FIG. 3 the actuator 12 has further decreased the distance between the distal end of the tensioning element 6 and the fixed position of the actuator 12 compared to that in FIG. 1.

The actuator 12 may return the tensioning element 6 to the first configuration by reducing the tension in the tensioning element 6. The elasticity of the flexural element 4 causes the flexural element to return to the substantially planar configuration shown in FIG. 2. Furthermore, the elasticity allows the geometry of the variable geometry structure 2 to be repeatedly varied.

Although the tensioning element 6 has been described as having first and second configurations, the actuator 12 may control the tension in the tensioning element so as to place the flexural element 4 in any number of positions, which may include the free position.

In the example of a variable area nozzle, the geometry of the structure can be varied so as to increase the area of the nozzle. Alternatively, the positions may be reversed so as to provide a reduction in the area of the nozzle.

The forcing element has been described as a tensioning element since, in the previous embodiment, the actuator pulls the forcing element and thus places it under tension. However, the forcing element may have sufficient rigidity so that it can be pushed (as well as or instead of being pulled) by the actuator. Pushing the forcing element increases the load on the flexural element and thus deforms the flexural element. In this case, the forcing element is placed under compression as a result of the resistance of the flexural element to deformation. In other words, the actuating mechanism alters the distance between the distal end of the forcing element and the fixed position of the actuator and in particular increases the distance between the distal end of the forcing element and the fixed position of the actuator.

The forcing element may be located on the opposite side of the flexural element to that previously described so that in the free or undeformed position the flexural element is curved downwards toward the forcing element. In use, the actuating mechanism of the actuator may displace the forcing element by pushing it in a longitudinal direction, thereby compressing the forcing element and bending the flexural element upwards from the free position to a substantially planar configuration. The actuator may further displace the forcing element to bend the flexural element from this first configuration to the second configuration, as described previously. The forcing element has a fixed length and the forcing element consists of a material with normal elastic properties, e.g. it returns to its original shape/length when a deforming load, or stress, is removed.

Figure 4:
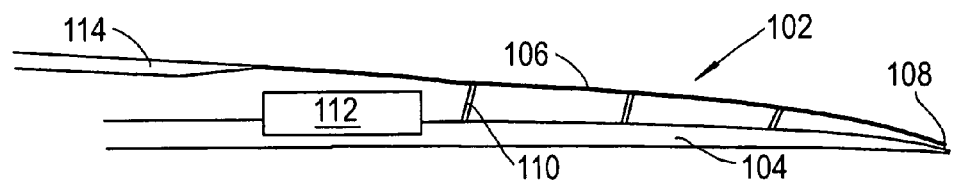
FIG. 4 is a cross-sectional side view of another embodiment of a variable geometry structure.

FIG. 4 shows another embodiment of a variable geometry structure 102. As in the previously described embodiment, the variable geometry structure 102 comprises a flexural element 104 and a tensioning element 106 which are connected at their distal ends.

A plurality of spacing members 110 are provided between the flexural element 104 and tensioning element 106.

In contrast to the previously described embodiment, the proximal end of the tensioning element 106 is connected to a cover member 114. The connection of the tensioning element 106 to the cover member 114 bends the flexural element 104 upwards from the free position. In this first configuration the flexural element 104 is substantially planar and is stressed in bending. The tensioning element 106 again has a fixed length and the tensioning element 106 consists of a material with normal elastic properties, e.g. it returns to its original shape/length when a deforming stress, or load, is removed.

Figure 5:
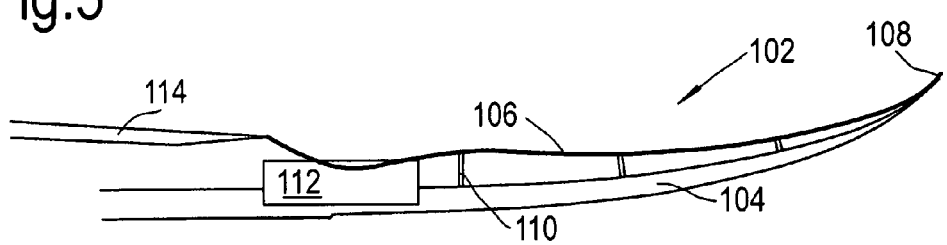
FIG. 5 is a cross-sectional side view of the variable geometry structure of FIG. 4 in a second configuration.

In this embodiment, an actuator 112 is provided having an actuating mechanism which is operable to displace a portion of the tensioning element 106 in a transverse direction, as shown in FIG. 5. By displacing the portion of the tensioning element 106 in the transverse direction, the direct distance between the ends of the tensioning element 106 is reduced or the distance between the distal end of the tensioning element 106 and the cover member 114 is reduced. Therefore, in this second configuration the tension in the tensioning element 106 and the load placed on the flexural element 104 is increased, causing the geometry of the structure 2 to be varied.

The actuating mechanism of the actuator 112 may displace the portion of the tensioning element 106 by pulling the tensioning element 106 in the transverse direction. The elasticity of the flexural element 104 causes the tensioning element 106 to return to the first configuration when the actuating mechanism ceases to pull the tensioning element 106.

Alternatively, the tensioning element 106 may comprise a portion of a shape memory material adjacent to the actuator 112. The actuating mechanism of the actuator 112 is configured to heat the shape memory material above a predetermined temperature. In this arrangement the shape memory material is connected to the cover member 114 and to remaining portion of the tensioning element 106 and the remaining portion of the tensioning element 106 has a fixed length and consists of a material with normal elastic properties.

Above the predetermined temperature the shape memory material changes shape. For example, the shape memory material may change from substantially planar to curved, or vice versa. The activation of the shape memory material causes the distance between the ends of the tensioning element 106 to change, or the distance between the distal end of the tensioning element 106 and the cover member 114 to change, thus changing the load placed on the flexural element 104 and changing the geometry of the structure 102.

Although the tensioning element 106 has been described and shown as being pulled towards the flexural element 104 by the actuating mechanism, the same effect may be achieved by pushing the tensioning element 106 away from the flexural element 104.

Figure 6:
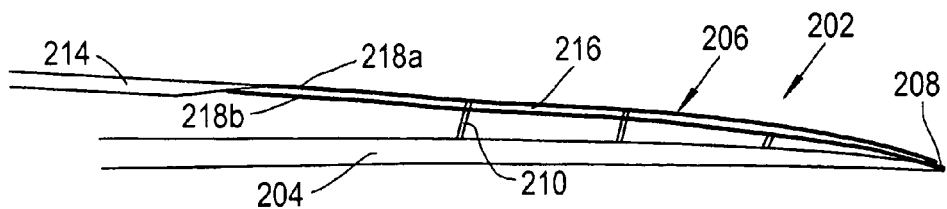
FIG. 6 is a cross-sectional side view of another embodiment of a variable geometry structure.

FIG. 6 shows another embodiment of a variable geometry structure 202. As in the previously described embodiments, the variable geometry structure 202 comprises a flexural element 204 and a tensioning element 206 which are connected at their distal ends.

A plurality of spacing members 210 are provided between the flexural element 204 and tensioning element 206.

The proximal end of the tensioning element 206 is connected to a cover member 214. The connection of the tensioning element 206 to the cover member 214 bends the flexural element 204 upwards from the free position. In this first configuration the flexural element 204 is substantially planar and is stressed in bending.

In contrast to the previously described embodiments, the tensioning element 206 of the present embodiment comprises a cavity 216 formed between a pair of flexible membranes 218a, 218b. The flexible membranes 218a, 218b of the tensioning element 206 again each have a fixed length and the flexible membranes 218a, 218b consist of a material with normal elastic properties as discussed previously.

The actuator (not shown) is configured to expand and/or contract the cavity 216 thereby changing the shape of the cavity 216. For example, the actuator may inflate and/or deflate the cavity 216 using a pressurised fluid. Alternatively, individual actuators may be provided between the membranes 218a, 218b to force the membranes 218a, 218b away from one another.

In the first configuration shown in FIG. 6, the cavity 216 is in an unexpanded state where the membranes 218a, 218b are substantially planar. Expanding the cavity 216 causes the membranes 218a, 218b to deviate from this planar configuration at one or more locations. This causes the distance between the ends of the tensioning element 206 to be reduced or causes the distance between the distal end of the tensioning element 206 and the cover member 214 to be reduced. Consequently, the load on the flexural element 204 increases causing the flexural element 204 to bend and thus varying the geometry of the structure 202.

Figure 7:
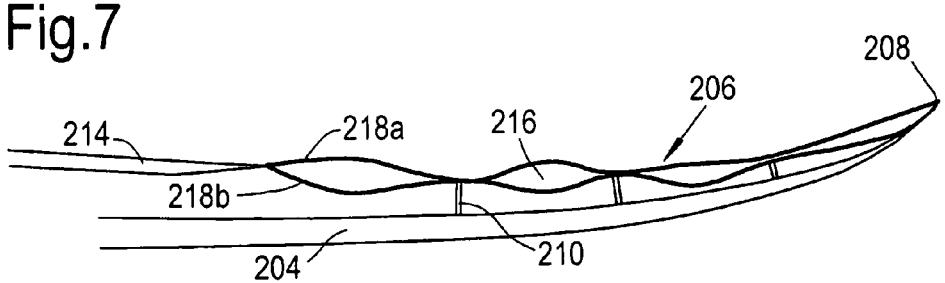
FIG. 7 is a cross-sectional side view of the variable geometry structure of FIG. 6 in a second configuration.
Figure 8:
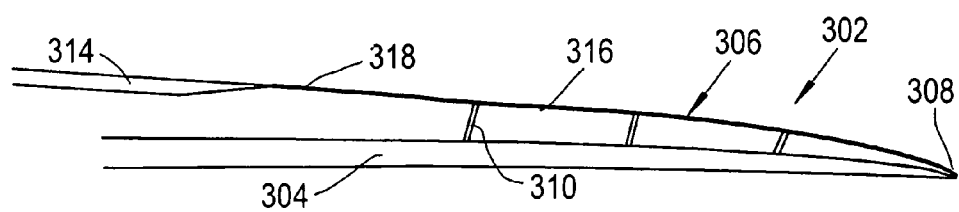
FIG. 8 is a cross-sectional side view of another embodiment of a variable geometry structure.
Figure 9:
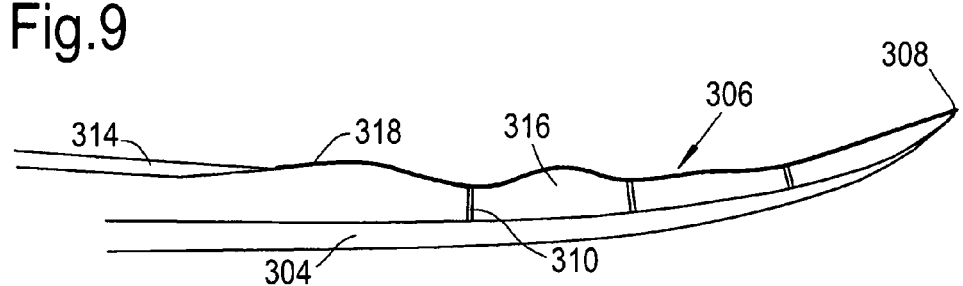
FIG. 9 is a cross-sectional side view of the variable geometry structure of FIG. 8 in a second configuration.

Although the cavity 216 has been described as being formed between the membranes 218a, 218b, it may alternatively be formed between a single flexible membrane and the flexural element 204. For example, FIGS. 8 and 9 show the cavity 316 formed between a single flexible membrane 318 and a flexural element 304. As in the embodiment of FIGS. 6 and 7, the variable geometry structure 302 comprises the flexural element 304 and a tensioning element 306 which are connected at their distal ends (indicated at 308), with the proximal end of the tensioning element 306 being connected to a cover member 314, and with a plurality of spacing members 310 provided between the flexural element 304 and the tensioning element 306.

Although the example of a variable area nozzle has been described, the variable geometry structures described herein may be used in various applications. For example, the variable geometry structure may be used in other areas of a gas turbine engine, such as in heat exchanger intakes, adaptive inlet particle separators, blades, vane leading edges, variable combustor geometry, etc. The variable geometry structure may also be used in airframe controls, for example as slats, flaps, or a rudder, and in automotive applications such as adaptive spoilers/wings, and radiator or other heat exchanger intakes etc.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

The invention claimed is:

1. A variable geometry structure comprising:
a flexural element having a distal end;
a tensioning element having a forward end and a distal end, the distal end of the tensioning element being connected to the distal end of the flexural element; and
an actuator comprising an actuator mechanism directly connected to the forward end of the tensioning element for adjusting the tensioning element to change the load placed on the flexural element, thereby bending the flexural element to change the geometry of the structure, the actuator being secured to the flexural element and the actuator mechanism being configured to adjust the tensioning element by pulling the forward end of the tensioning element, wherein
the tensioning element has at least first, second and third configurations, the flexural element being substantially planar when the tensioning element is in the first configuration, the flexural element being curved in a first direction when the tensioning element is in the second configuration, the second configuration placing a higher load on the flexural element than the first configuration, and the flexural element being curved in a second, opposite direction and being unstressed by the tensioning element in the third configuration,
the actuator being configured to move the tensioning element between the at least first, second and third configurations.

2. A variable geometry structure as claimed in claim 1, wherein
the actuator is configured to pull the tensioning element in a longitudinal direction.

3. A variable geometry structure as claimed in claim 2, wherein
the actuator is selected from the group consisting of a ball screw and a spool around which the tensioning element is wound.

4. A variable geometry structure as claimed in claim 1, wherein
the tensioning element and flexural element are separated by a spacing member.

5. A variable geometry structure as claimed in claim 1, wherein
the flexural element is elastically deformable.

6. A variable geometry structure as claimed in claim 1, wherein
the tensioning element has a fixed length.

7. A component comprising a variable geometry structure as claimed in claim 1.

8. A component as claimed in claim 7, wherein
the component is selected from the group consisting of a nozzle, a radiator, a heat exchanger intake, an inlet particle separator, a vane, a combustor, a spoiler, a wing, a slat, a flap and a rudder for airframe control.

9. A variable geometry structure comprising:
a flexural element having a distal end;
a forcing element having a forward end and a distal end, the distal end of the forcing element being connected to the distal end of the flexural element; and
an actuator comprising an actuator mechanism directly connected to the forward end of the forcing element for adjusting the forcing element to change the load placed on the flexural element, thereby bending the flexural element to change the geometry of the structure, the actuator being secured to the flexural element, the actuator mechanism being configured to control the forcing element to move the flexural element between at least first, second and third fixed positions, the first fixed position being a substantially planar position, the actuator mechanism moving the flexural element in a first direction from the first fixed position to the second fixed position, and the actuator mechanism moving the flexural element in a second direction opposite from the first direction from the first fixed position to the third fixed position.

10. A variable geometry structure comprising:
a flexural element having a distal end;
a tensioning element having a forward end and a distal end, the distal end of the tensioning element being connected to the distal end of the flexural element, the tensioning element having a fixed length, the tensioning element comprising a material which returns to its original shape when a mechanical deforming load is removed, the tensioning element and the flexural element being separated by at least one spacing member, the at least one spacing member securing the tensioning element and the flexural element together; and
an actuator comprising an actuator mechanism directly connected to the forward end of the tensioning element for adjusting the tensioning element by exerting the mechanical deforming load on the tensioning element to change the load placed on the flexural element, thereby bending the flexural element to change the geometry of the structure, the actuator being secured to the flexural element.

11. A variable geometry structure comprising:
a flexural element having a distal end;
a tensioning element having a distal end, the distal end of the tensioning element being connected to the distal end of the flexural element, and the tensioning element having a proximal end, the proximal end of the tensioning element being connected to a cover member, the cover member forming an aerodynamically smooth surface with the tensioning element; and
an actuator for adjusting the tensioning element to change the load placed on the flexural element, thereby bending the flexural element to change the geometry of the structure, the actuator being configured to push or pull a portion of the tensioning element in a transverse direction, the actuator being configured to control the tensioning element to move the flexural element between at least first and second fixed positions, the first fixed position being a substantially planar position, the actuator mechanism moving the flexural element in a first direction from the first fixed position to the second fixed position.

12. A variable geometry structure as claimed in claim 11, wherein
the portion of the tensioning element comprises a shape memory material, and the actuator is configured to heat the shape memory material above a predetermined temperature thereby changing the shape of the shape memory material and changing the load on the flexural element.

13. A variable geometry structure comprising:
a flexural element having a distal end;
a tensioning element having a distal end, the distal end of the tensioning element being connected to the distal end of the flexural element, the tensioning element comprising a cavity; and
an actuator for adjusting the tensioning element to change the load placed on the flexural element, thereby bending the flexural element to change the geometry of the structure, the tensioning element having a proximal end, the proximal end of the tensioning element being connected to a cover member, the cover member covering the flexural element, the actuator being configured to use a pressurised fluid to inflate or deflate the cavity thereby changing the shape of the cavity and changing the load on the flexural element.

14. A variable geometry structure as claimed in claim 13, wherein the tensioning element comprises first and second layers and wherein the cavity is formed between the first and second layers, the first and second layers being substantially planar and parallel to each other in the first fixed position.

15. A variable geometry structure comprising:
a flexural element having a distal end;
a tensioning element having a distal end, the distal end of the tensioning element being connected to the distal end of the flexural element, a cavity being formed between the tensioning element and the flexural element; and
an actuator for adjusting the tensioning element to change the load placed on the flexural element, thereby bending the flexural element to change the geometry of the structure, the tensioning element having a proximal end, the proximal end of the tensioning element being connected to a cover member, the cover member covering the flexural element, the actuator being configured to use a pressurised fluid to inflate or deflate the cavity thereby changing the shape of the cavity and changing the load on the flexural element.

* * * * *